United States Patent
Schmalenberg et al.

(10) Patent No.: US 11,592,560 B2
(45) Date of Patent: Feb. 28, 2023

(54) FREQUENCY MODULATED CONTINUOUS WAVE LIDAR WITH LOCKED DUAL LASERS

(71) Applicants: Toyota Motor Engineering & Manufacturing North America, Inc., Plano, TX (US); Toyota Jidosha Kabushiki Kaisha, Toyota (JP)

(72) Inventors: Paul Donald Schmalenberg, Ann Arbor, MI (US); Yasuo Uehara, Gotemba (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 304 days.

(21) Appl. No.: 16/844,452

(22) Filed: Apr. 9, 2020

(65) Prior Publication Data
US 2021/0318435 A1    Oct. 14, 2021

(51) Int. Cl.
*G01C 3/08* (2006.01)
*G01S 17/26* (2020.01)
*G01S 7/4861* (2020.01)
*G01S 7/48* (2006.01)

(52) U.S. Cl.
CPC ............ *G01S 17/26* (2020.01); *G01S 7/4808* (2013.01); *G01S 7/4861* (2013.01)

(58) Field of Classification Search
None
See application file for complete search history.

(56) References Cited

U.S. PATENT DOCUMENTS

| | | | |
|---|---|---|---|
| 7,592,943 B2 | 9/2009 | Beasley | |
| 7,986,397 B1 | 7/2011 | Tiemann et al. | |
| 8,687,173 B2 | 4/2014 | Rezk et al. | |
| 11,360,213 B2 * | 6/2022 | Asghari | G01S 17/36 |
| 2002/0071109 A1 * | 6/2002 | Allen | G01S 17/34 |
| | | | 356/5.01 |
| 2010/0073222 A1 | 3/2010 | Mitomo et al. | |

FOREIGN PATENT DOCUMENTS

WO     WO 0208780 A2 *   1/2002   ............. G01S 17/34

* cited by examiner

*Primary Examiner* — Mark Hellner
(74) *Attorney, Agent, or Firm* — Christopher G. Darrow; Darrow Mustafa PC

(57) ABSTRACT

A frequency-modulated continuous wave (FMCW) LIDAR can be configured to reduce re-reflection and cross-coupling in the FMCW LIDAR. A first laser can be configured to generate a ranging signal, and a second laser can be configured to generate a local oscillator signal. A feedback control can be configured to maintain an offset between the ranging signal and the local oscillator signal. The offset can be a non-zero value. A transmit portion configured to emit a reference laser signal based on the ranging signal into an environment. A receiver portion can be configured to receive a return laser signal from the environment. The return laser signal can be a reflected version of the reference laser signal. A receiver photodetector can be configured to combine the return laser signal and the local oscillator signal.

18 Claims, 2 Drawing Sheets

FREQUENCY MODULATED CONTINUOUS WAVE LIDAR WITH LOCKED DUAL LASERS

FIELD

The subject matter described herein relates in general to LIDAR sensors and, more particularly, to frequency modulated continuous wave (FMWC) LIDAR sensors.

BACKGROUND

A frequency-modulated continuous wave (FMCW) LIDAR can use a single optical sensor source that is configured with a continuous wave frequency modulated sweep. The FMCW LIDAR can emit a reference laser beam or signal. This reference laser signal may be reflected off of an object. The reflected laser signal can be received by a receiver of the FMWC LIDAR. The reflected laser signal is a time-delayed version of the emitted reference laser signal. By comparing the outbound laser signal with a reflected laser signal, a distance between the FMCW LIDAR and the object that caused the laser signal to be reflected can be determined.

SUMMARY

In one respect, the subject matter presented herein relates to an FMCW LIDAR system. The system can include a first laser configured to generate a ranging signal. The system can include a second laser configured to generate a local oscillator signal. The system can include a feedback control configured to maintain an offset between the ranging signal and the local oscillator signal. The offset can be a non-zero value. The system can include a transmit portion configured to emit a reference laser signal based on the ranging signal into an environment. The system can include a receiver portion configured to receive a return laser signal from the environment. The return laser signal being a reflected version of the reference laser signal after being reflected off of an object in the environment. The system can include a receiver photodetector configured to combine the return laser signal and the local oscillator signal.

In another respect, the subject matter presented herein relates to an FMCW LIDAR method. The method can include generating, using a first laser, a ranging signal. The method can include generating, using a second laser, a local oscillator signal. The method can include maintaining an offset between the ranging signal and the local oscillator signal. The offset can be a non-zero value. The method can include emitting a reference laser signal into an environment. The reference laser signal can be based on the ranging signal. The method can include receiving a return laser signal from the environment. The return laser signal can be a reflected version of the reference laser signal after being reflected off of an object in the environment. The method can include combining the return laser signal and local oscillator signal.

In still another respect, the subject matter presented herein relates to a computer program product for an FMCW LIDAR, the computer program product comprising a computer readable storage medium having program code embodied therewith, the program code executable by a processor to perform a method. The method can include generating, using a first laser, a ranging signal. The method can include generating, using a second laser, a local oscillator signal. The method can include maintaining an offset between the ranging signal and the local oscillator signal. The offset can be a non-zero value. The method can include emitting a reference laser signal into an environment. The reference laser signal can be based on the ranging signal. The method can include receiving a return laser signal from the environment. The return laser signal can be a reflected version of the reference laser signal after being reflected off of an object in the environment. The method can include combining the return laser signal and local oscillator signal.

DETAILED DESCRIPTION

Figure 1:
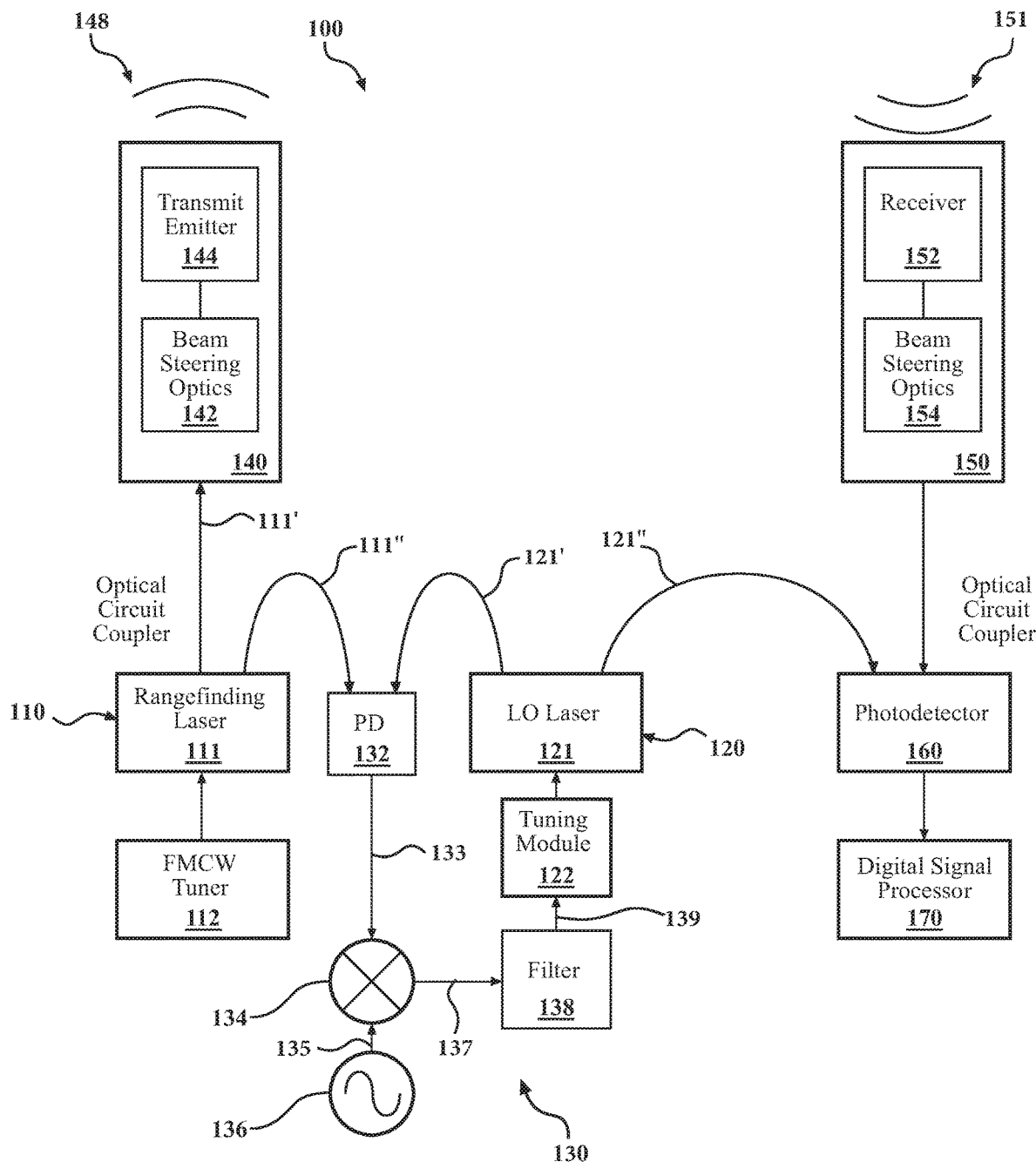
FIG. 1 is an example of a FMCW LIDAR system.

In some conditions, n Frequency Modulated Continuous Wave (FMCW) Light Detection and Ranging (LIDAR) system may be susceptible to noise, caused by the offset between the emitted reference laser signal and the return laser signal being 0 Hz or DC. Additionally, the system may also be susceptible to noise from re-reflection, which can occur when a portion of the ranging signal (used to generate the reference laser signal) reflects within the system and may self-mix with the return laser signal.

Arrangements presented herein are directed to eliminating the DC signal that creates noise and/or to reducing self-mixing within the system. The FMCW LIDAR system can includes two laser sources. The first laser source can output a ranging signal which is emitted as a reference laser signal. The second laser source can output a local oscillator signal. The local oscillator signal can be offset from the ranging signal by a predetermined frequency, using a feedback control. This can result in the zero range being offset so that it is not a DC signal that creates noise.

The system receives a return laser signal which is a time-delayed version of the reference laser signal that reflected off an object. The system can reduce noise in various ways. As an example, the return laser signal can mix with the local oscillator signal that has a different laser source from the ranging signal. This isolates the return laser signal and the local oscillator signal, significantly reducing self-mixing. As another example, the system having a second laser source located between the first laser source and the portion of the system that receives the return laser signal can allows the system to maintain a sufficient physical distance between the ranging signal and the return laser signal to reduce self-mixing.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
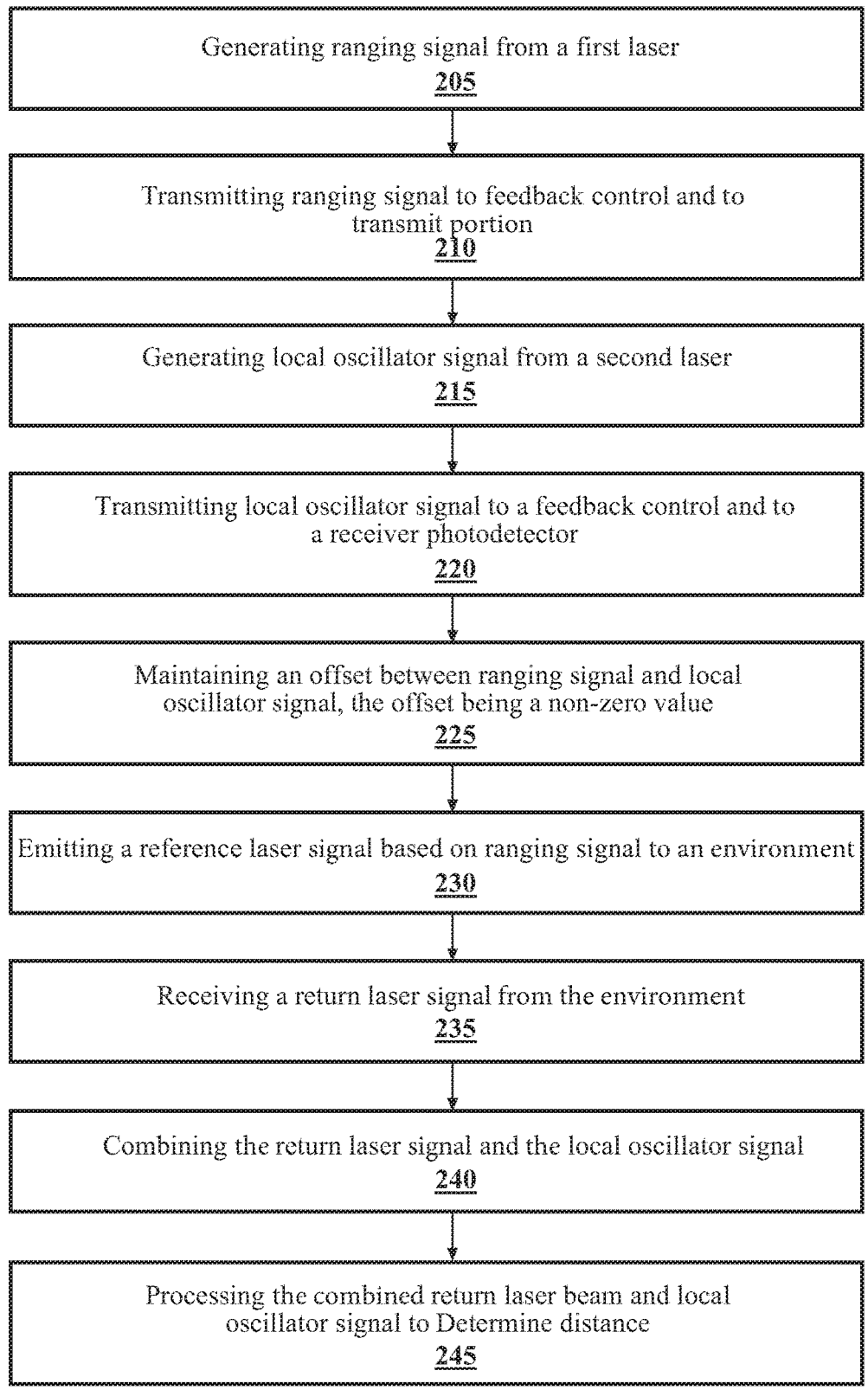
FIG. 2 is an example of a method for reducing noise and self-mixing in a FMCW LIDAR system.

With reference to FIG. 1, an example of an FMCW LIDAR system 100 is shown. The FMCW LIDAR system 100 can include various elements, which can be communicatively linked in any suitable form. As an example, the elements can be connected as shown in FIG. 1. Some of the possible elements of the FMCW LIDAR system 100 are shown in FIG. 1 and will now be described. It will be understood that it is not necessary for the FMCW LIDAR system 100 to have all of the elements shown in FIG. 1 or described herein. The FMCW LIDAR system 100 can have any combination of the various elements shown in FIG. 1. Further, the FMCW LIDAR system 100 can have additional elements to those shown in FIG. 1. In some arrangements, the FMCW LIDAR system 100 may not include one or more of the elements shown in FIG. 1. Further, it will be understood that one or more of these elements can be physically separated by large distances.

The elements of the FMCW LIDAR system 100 can be communicatively linked through one or more communication networks. As used herein, the term "communicatively linked" can include direct or indirect connections through a communication channel or pathway or another component or system. A "communication network" means one or more components designed to transmit and/or receive information from one source to another. The one or more of the elements of the FMCW LIDAR system 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The FMCW LIDAR system 100 can include a first laser 110, a second laser 120. The FMCW LIDAR system can include a transmitter portion 140, a receiver portion 150, and a feedback control 130. In some arrangements, the FMCW LIDAR system 100 can be implemented as a single system on a chip ("SoC"). In some arrangements, the first laser 110 and the second laser 120 can be integrated on a single chip.

The first laser 110 and the second laser 120 can have different wavelengths so that the cross-correlation is reduced. Though the first laser 110 and the second laser 120 have different wavelengths, they have the same modulation slope. The cross correlation can also be reduced by having the first laser 110 and the second laser 120 spatially separated on the chip. There can be any suitable spacing between the first laser 110 and the second laser 120. For instance, in some arrangements, such as when there are no barriers or other structures between the first laser 110 and the second laser 120, the distance can be from substantially 1 mm to substantially 2 mm. In some arrangements, if there are barriers or other structures between the first laser 110 and the second laser 120, the spacing can be in the range of hundreds of microns.

The first laser 110 can be any suitable laser, now known or later developed. In one or more arrangements, the first laser 110 can be a rangefinding laser 111. The first laser 110 can be a laser energy source that is configured with a continuous wave frequency modulated sweep. The first laser 110 can output laser signals 111', 111" with any suitable modulation slope. In some arrangements, the laser signal of the first laser 110 can have sawtooth modulation or triangle wave modulation. In some arrangements, the laser signals 111', 111" can be separately generated signals. In some arrangements, the laser signals 111', 111" can be portions of an initially generated laser signal. The first laser 110 can output laser signals 111', 111" substantially simultaneously. Laser signals 111', 111" can be substantially identical to each other. Laser signal 111' can be output to a transmitter portion 140, and laser signal 111" can be output to a photodetector 132.

The modulation slope can be generated by an FMCW tuner 112 operatively connected to control the output of the first laser 110. The FMCW tuner 112 can be any FMCW tuner, now known or later developed.

The second laser 120 can be any suitable laser, now known or later developed. In one or more arrangements, the second laser 120 can be a local oscillator (LO) laser. The second laser 120 can be a laser energy source that is configured with an offset of a predetermined frequency using a tuning module 122. The second laser 120 can output LO laser signals 121', 121". In some arrangements, the LO laser signals 121', 121" can be separately generated signals. In some arrangements, the LO laser signals 121', 121" can be portions of an initially generated laser signal. The second laser 120 can output LO laser signals 121', 121" substantially simultaneously. LO laser signals 121', 121" can be substantially identical to each other. LO laser signal 121' can be output to the photodetector 132, and LO laser signal 121" can be output to a receiver photodetector 160.

The FMCW LIDAR system 100 can include the transmitter portion 140 and the receiver portion 150. The transmitter portion 140 can be configured to emit reference laser signals 148 into an environment. The transmitter portion 140 can be operatively connected to the first laser 110, including, for example, by an optical circuit coupler. The transmitter portion 140 can include beam steering optics 142 and/or a transmit emitter 144. The beam steering optics 142 can be operatively connected to the transmit emitter 144. The beam steering optics 142 can be any suitable type of beam steering optics, now known or later developed. The beam steering optics 142 can be configured to determine a direction of travel of the reference laser signal in any suitable manner, now known or later developed. The beam steering optics 142 can adjust the direction in any suitable manner, such as by using, one or more mirrors, one or more prisms, one or more lenses, and/or one or more rotating diffraction gratings. The transmit emitter 144 can be any type of transmit emitter, now known or later developed. The transmitter portion 140 can receive laser signals from the first laser 110. The transmitter portion 140 can be configured to transmit the reference laser signals 148 in the determined direction.

The receiver portion 150 can be configured to receive return laser signals 151 from the environment. The return laser signals 151 can be reflected versions of the reference laser signals 148 emitted at an earlier point in time by the transmitter portion 140. The reference laser signals 148 can have reflected off of an object in the environment. The receiver portion 150 can include a receiver 152 and/or beam steering optics 154. The receiver 152 can be operatively connected to the beam steering optics 154. The receiver 152 can be any suitable type of receiver, now known or later developed. The beam steering optics 154 can be any suitable type of beam steering optics, now known or later developed. The receiver 152 can receive the return laser signals from a direction determined by the beam steering optics 154.

The receiver portion 150 can be operatively connected to a receiver photodetector 160. As an example, in one or more arrangements, the receiver portion 150 can be operatively connected to the receiver photodetector 160 directly or by an optical circuit coupler. Thus, the return laser signals 151 received by the receiver portion 150 can be sent to the receiver photodetector 160. In one or more instances, the return laser signals 151 can be combined with a LO laser signal 121" from the second laser 120 in the receiver photodetector 160.

The receiver photodetector 160 can be operatively connected to a digital signal processor 170. The return laser signals 151 and/or LO laser signals 121" from the second laser 120 can be sent to the digital signal processor 170. The digital signal processor 170 can analyze the laser signals in any suitable manner, now know or later developed. For instance, the return laser signals 151 and/or LO laser signals 121" may be used to determine the distance between the object that reflected the return laser signal and the FMCW LIDAR system 100. Any suitable method may be used to calculate the distance.

The combined signal may be transmitted to a digital signal processor (DSP) 170, where the combined signal may be used to determine the distance between the object that reflected the return laser signal and the FMCW LIDAR system 100. Any suitable method may be used to calculate the distance.

As noted above, the FMCW LIDAR system 100 can include the feedback control 130. The feedback control 130 can be applied to the second laser 120 to maintain the offset between the laser signals 111', 121" substantially constant.

The feedback control 130 can include the photodetector 132, an RF mixer 134, an offset oscillator 136, a filter 138, and a tuning module 122.

The photodetector 132 can be any suitable photodetector, now known or later developed. The photodetector 132 can receive laser signal 111" from the first laser 110 and LO laser signal 121' from the second laser 120. The photodetector 132 can output an RF signal 133, which can be the difference between the laser signals 111", 121'. The photodetector 132 can be operatively connected to the RF mixer 134. The photodetector 132 can output the RF signal 133 to the RF mixer 134.

The RF mixer 234 can be any suitable mixer, now known or later developed. The RF mixer 134 can be operatively connected to the photodetector 132 and the offset oscillator 136. The RF mixer 134 can be configured to mix the RF signal 133 with a signal 135 from the offset oscillator 136, resulting in a mixed RF signal 137.

The RF mixer 134 can be operatively connected to the filter 138. The mixed RF signal 137 can be output to the filter 138. The filter 138 can be matched closely to the offset oscillator 136. The filter 138 can be configured to filter, discard, or ignore unwanted RF mixer products in the mixed RF signal 137, leaving a filtered RF signal 139. The filtered RF signal 139 can be at the frequency of the target offset differential. The filtered RF signal 139 can be sent to the tuning module 122.

The tuning module 122 can be implemented as computer readable program code that, when executed by a processor, implement one or more of the various processes described herein. The tuning module 122 can be a component of one or more processors, or the tuning module 122 can be executed on and/or distributed among other processing systems to which one or more processors are operatively connected. The tuning module 122 module can include instructions (e.g., program logic) executable by one or more processors. Alternatively or in addition, one or more data stores may contain such instructions. The tuning module 122 modules can include artificial or computational intelligence elements, e.g., neural network, fuzzy logic or other machine learning algorithms. The tuning module 122 can configure the second laser 120 so that its output LO laser signals 121', 121" are offset from the laser signals 111', 111" of a predetermined frequency. The tuning module 122 can maintain the offset frequency over time.

The rangefinding laser 111 and the LO laser 121 can substantially simultaneously emit their respective laser signals 111', 111", 121', 121". The laser signals 111' can be received by the transmitter portion 140. Using the beam steering optics 142 and the transmit emitter 144, the transmitter portion 140 can transmit the laser signal 111' into the environment as a reference laser signal 148.

The reference laser signal 148 may impinge upon an object in the environment. In such case, the reference laser signal 148 can reflect off of the object. The reflected version of the reference laser signal 148 can be received by the receiver portion 150 as a return laser signal 151. The receiver portion 150 can send the return laser signal 151 to the receiver photodetector 160 where it can be combined with the LO laser signal 121" from the LO laser 121. The combined signal can be sent to the digital signal processor 170 for analysis, which can include, for example, the distance between the object that reflected the return laser signal and the FMCW LIDAR system 100.

The laser signal 111' and the LO laser signal 121' can be received by the feedback control 130 of the FMCW LIDAR system 100. The laser signal 111' and the LO laser signal 121' can be received by photodetector 132, which can output an RF signal 133, which can be a frequency that is the difference between the laser signals 111", 121'. The RF signal 133 can be sent to the RF mixer 234 which mixes the RF signal 133 with the signal 135 from the offset oscillator 136 to create a mixed RF signal 137. The mixed RF signal 137 can be filtered by the filter 138. The filtered RF signal, being at the frequency of the target offset differential, can be output to the tuning module 122. The tuning module 122 can configure the second laser 120 so that its output LO laser signals 121', 121" are offset from the laser signals 111', 111" of a predetermined frequency. The tuning module 122 can maintain the offset frequency over time. The above process can repeat continuously, periodically, irregularly, randomly, in response to a trigger condition, or in response to receiving an input or command. The FMCW LIDAR system 100 can be implemented in various application. In one or more arrangement, the FMCW LIDAR system 100 can be implemented in an automotive application. In some arrangements, the FMCW LIDAR system 100 can provide output to one or more systems of a vehicle. In some arrangements, the FMCW LIDAR system 100 can be part of a sensor system of a vehicle.

Now that the various potential systems, devices, elements and/or components of the FMCW LIDAR system 100 have been described, various methods will now be described. Various possible steps of such methods will now be described. The methods described may be applicable to the arrangements described above in relation to FIG. 2, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Referring now to FIG. 2, an example of a method 200 for an FMCW LIDAR system 100 is shown. The method 200 will be discussed with respect to the FMCW LIDAR system 100 of FIG. 1. However, it should be appreciated that the method 200 is not limited to being implemented only within the FMCW LIDAR system 100 but is instead one example of a system that may implement the method 200.

At 205, a ranging signal (e.g., laser signal 111', 111") can be generated by the first laser 110. The first laser 110 can be controlled by the FMCW tuner 112. The first laser 110 can be configured for a continuous wave frequency modulated sweep based on the FMCW tuner 112. The FMCW tuner 112 can generate the modulation slope of the laser signals 111', 111" output by the first laser 110.

At 210, the laser signal 111', 111" can be transmitted to the transmitter portion 140 and to the feedback control 130. More particularly, a portion of the laser signal 111' can be transmitted to the transmitter portion 140, and a portion of the laser signal 111" can be transmitted to the feedback control 130 (e.g., the photodetector 132). The transmission of the laser signals 111', 111" can be performed using, for example, an optical circuit coupler.

At 215, a local oscillator signal (e.g., local oscillator laser signal 121', 121") can be generated by the second laser 120. The local oscillator signal can be offset from the ranging signal by a predetermined frequency received from a tuning module 122. The offset can be substantially maintained by a feedback control 130. For instance, the tuning module 122 can receive an offset RF signal 139. The offset RF signal can be used to tune the second laser 120 to keep the local oscillator signal continuously offset from the ranging signal. In some arrangements, as an example, the offset may be between substantially 20 MHz and substantially 100 MHz. As another example, the offset may be up to substantially 500 MHz, such as when a stronger digital signal processor is used. The second laser 120 can output a portion of the local oscillator laser signal 121" to the receiver photodetector 160 as well.

At 220, the local oscillator laser signal 121' can be transmitted to the feedback control 130. The second laser 120 can transmit at least some of the local oscillator laser signal 121" to the receiver photodetector 160 and to the feedback control 130.

At 225, the feedback control 130 can receive at least portion of the ranging signal and at least a portion of the local oscillator signal. More particularly, the photodetector 132 can receive a portion of the laser signal 111" and a portion of the local oscillator laser signal 121'. The photodetector 132 can output an RF signal, which the difference between the ranging signal and the local oscillator signal. The RF mixer 134 can mix the output of the photodetector 132 with the output of an offset oscillator 136 having a frequency that matches a goal offset differential. The output of the RF mixer 134 can be fed through a filter 138, which can filter out any undesired RF mixer products, leaving the desired offset RF signal. As mentioned above, the offset RF signal can be fed to the tuning module 122, such that the feedback control 130 can maintain the offset between the ranging signal and the local oscillator signal. The offset can be a non-zero value.

At 230, the transmitter portion 140 can emit the ranging signal as a reference laser signal using the transmit emitter 144, with the direction of travel of the reference laser signal determined by the beam steering optics 142.

At 235, the receiver portion 150 may receive a return laser signal, which, as explained previously, may be an earlier version of the reference laser signal after having been reflected off of an object. The receiver portion 150 may receive the return laser signal using the receiver 152 and from a direction determined by the second beam steering optics 154. The receiver portion 150 can transmit at least a portion of the return laser signal to the optical circuit coupler 162.

At 240, in one or more instances, the optical circuit coupler 162 can receive at least some of the local oscillator signal from the second laser 120 (via the optical circuit coupler 124) and at least some of the return laser signal, and the optical circuit coupler 124 may transmit a combined signal of the local oscillator signal and the return laser signal to the receiver photodetector 160. In another instance, the receiver photodetector 160 may receive at least some of the local oscillator signal from the second laser 120 (via the optical circuit coupler 124) and at least some of the return laser signal, and the receiver photodetector 160 may combine the local oscillator signal and the return laser signal. The combined signal, in either instance, may be transmitted to a DSP 170.

At 245, the DSP 170 can process the combined signal of the local oscillator signal and the return laser signal to determine the time delay between the two signals. Based on the determined time, the digital signal processor 170 can determine the distance between the object and the FMCW LIDAR system 100.

The method 200 can end. Alternatively, the method 200 can return to block 205 or some other block.

It will be appreciated that arrangements described herein can provide numerous benefits, including one or more of the benefits mentioned herein. For example, arrangements described herein can reduce re-reflection and cross-coupling in a LIDAR system. Arrangements described herein can be used to adjust a Local Oscillator (LO) signal to be within a dynamic range of a photodetector, and further relating to offsetting the zero range such that it is not a DC signal that introduces noise. Arrangements described herein enable a rangefinding laser and a local oscillator laser to be disposed on the same chip.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances. The term "operatively connected," as used throughout this description, can include direct or indirect connections, including connections without direct physical contact.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A frequency-modulated continuous wave (FMCW) LIDAR system, comprising:
   a first laser configured to generate a ranging signal;
   a second laser configured to generate a local oscillator signal;
   a feedback control configured to maintain an offset between the ranging signal and the local oscillator signal, the offset being a non-zero value, the feedback control being operatively connected to control the local oscillator signal generated by the second laser, the feedback control including a photodetector, the photodetector receiving the ranging signal from the first laser and the local oscillator signal from the second laser, and the photodetector generating a combined laser signal;
   a transmit portion configured to emit a reference laser signal based on the ranging signal into an environment;
   a receiver portion configured to receive a return laser signal from the environment, the return laser signal being a reflected version of the reference laser signal; and
   a receiver photodetector configured to combine the return laser signal and the local oscillator signal.

2. The system of claim 1, wherein the first laser and the second laser are located on the same chip.

3. The system of claim 1, wherein the feedback control includes an RF mixer, wherein the RF mixer is operatively connected to receive the combined laser signal from the photodetector, and wherein the RF mixer operatively connected to an offset oscillator.

4. The system of claim 3, wherein the feedback control further includes a filter and a tuning module, wherein the filter is operatively connected to received mixed signals from the RF mixer, and wherein the filter outputs a filtered signal to the tuning module.

5. The system of claim 4, wherein the tuning module is configured to control the local oscillator signal generated by the second laser so that a predetermined offset between the ranging signal and the local oscillator signal is substantially maintained.

6. The system of claim 1, further including a FMCW tuner operatively connected to the first laser, and wherein the FMCW tuner is configured to control the ranging signal generated by the first laser.

7. The system of claim 1, further including a digital signal processor, wherein the digital signal processor is operatively connected to receive signals form the receiver photodetector, wherein the digital signal processor is configured to analyze the received signals to determine a characteristic of an object in the environment.

8. The system of claim 7, wherein the characteristic is a distance to the object.

9. The system of claim 1, wherein the first laser and the second laser are configured to transmit their respective signals substantially simultaneously.

10. A frequency-modulated continuous wave (FMCW) LIDAR method, the method comprising:
    generating, using a first laser, a ranging signal;
    generating, using a second laser, a local oscillator signal;
    maintaining, using a feedback control, an offset between the ranging signal and the local oscillator signal, the offset being a non-zero value, the feedback control being operatively connected to control the local oscillator signal generated by the second laser, the feedback control including a photodetector, the photodetector receiving the ranging signal from the first laser and the local oscillator signal from the second laser, and the photodetector generating a combined laser signal;
    emitting a reference laser signal into an environment, the reference laser signal being based on the ranging signal;
    receiving a return laser signal from the environment, the return laser signal being a reflected version of the reference laser signal after being reflected off of an object in the environment; and
    combining the return laser signal and the local oscillator signal.

11. The method of claim 10, wherein the first laser and the second laser are located on the same chip.

12. The method of claim 10, further including:
    analyzing the combined return laser signal and local oscillator signal, via a digital signal processor, to determine a characteristic of the object.

13. The method of claim 12, wherein the characteristic is a distance to the object.

14. The method of claim 10, wherein the first laser and the second laser are configured to transmit their respective signals substantially simultaneously.

15. The method of claim 10, wherein maintaining the offset between the ranging signal and the local oscillator signal includes controlling the local oscillator signal generated by the second laser so that a predetermined offset between the ranging signal and the local oscillator signal is substantially maintained.

16. The method of claim 10, further including:
    combining the ranging signal from the first laser and the local oscillator signal from the second laser to generate a combined laser signal.

17. A frequency-modulated continuous wave (FMCW) LIDAR method, the method comprising:
    generating, using a first laser, a ranging signal;
    generating, using a second laser, a local oscillator signal;
    maintaining an offset between the ranging signal and the local oscillator signal, the offset being a non-zero value;
    emitting a reference laser signal into an environment, the reference laser signal being based on the ranging signal;
    receiving a return laser signal from the environment, the return laser signal being a reflected version of the reference laser signal after being reflected off of an object in the environment;
    combining the return laser signal and the local oscillator signal;
    combining the ranging signal from the first laser and the local oscillator signal from the second laser to generate a combined laser signal;
    mixing the combined laser signal and an offset oscillator signal to generate a mixed signal;
    filtering the mixed signal to generate a filtered signal; and
    using the filtered signal to control the second laser.

18. A computer program product for reducing noise in a LIDAR sensor, the computer program product comprising a computer readable storage medium having program code embodied therewith, the program code executable by a processor to perform a method comprising:
    generating a ranging signal from a first laser;
    generating a local oscillator signal from a second laser;
    maintaining, using a feedback control, an offset between the ranging signal and the local oscillator signal, the offset being a non-zero value, the feedback control being operatively connected to control the local oscillator signal generated by the second laser, the feedback control including a photodetector, the photodetector receiving the ranging signal from the first laser and the local oscillator signal from the second laser, and the photodetector generating a combined laser signal;
    emitting a reference laser signal into an environment, the reference laser signal being based on the ranging signal;
    receiving a return laser signal from the environment, the return laser signal being a reflected version of the reference laser signal after being reflected off of an object in the environment; and
    combining the return laser signal and local oscillator signal.

* * * * *